Patented Jan. 9, 1945

2,366,781

UNITED STATES PATENT OFFICE 2,366,781

PLASTICS AND METHOD OF MAKING SAME

Bruce Geller, Fremont, Ohio

No Drawing. Application November 19, 1942,
Serial No. 466,219

3 Claims. (Cl. 106—163)

This invention relates to plastics, and particularly to lignin plastics.

Heretofore the crude cellulosic material such as sawdust has been treated in a bath, usually of water, wherein the bath forms the dispersion medium. Certain objections arise from the use of water or chemical compounds when used in an aqueous solution.

One important object of the invention is to provide an improved process for producing ligneous plastics wherein one step of the process involves the use of a non-aqueous bath as a dispersion medium.

A second important object of the invention is to provide, in such a method, a dispersion medium consisting of a non-aqueous bath chemically inert with respect to the basic ligneous material used in the production of the plastic.

A third important object of the invention is to provide a novel method utilizing an inert hydrocarbon such as paraffin as a dispersion medium in the production of ligneous based plastics.

With the above and other objects in view, as will be presently explained, the invention consists in general of a novel method of producing ligneous based plastics hereinafter fully described and particularly pointed out in the appended claims.

In carrying out this method in general, a sufficient quantity of a hydrocarbon is heated, the heat being sufficient to melt the hydrocarbon if the latter is normally in solid form. To this bath is added ligneous material such as sawdust and the mixture is agitated to produce a substantially uniform dispersion of the ligneous material in the bath, the application of heat being continued. During the agitation, urea is added slowly in sufficient quantity to soften the ligneous material and to increase its pliability. Then a small percentage of a mixture of acetic and sulphuric acids is added under continuing conditions of agitation and heat. The application of agitation and heat is continued for some time, after which a quantity of binder in the form of lignin resin is added. The mixture with the resin added is mixed thoroughly, after which the agitation is stopped and the solid matter allowed to settle while heat is still applied. The supernatant hydrocarbon is then removed and the remaining pulp thoroughly washed with hot water until all the dispersion medium has been removed from the pulp.

For molding there is added to the purified pulp, acetic acid and lignin resin and the ingredients are well mixed, after which the mass is molded under pressure and heat.

As a specific example of this method, the following procedure has been found to produce excellent results:

Into a molten bath of a paraffin hydrocarbon (paraffin) add 100 grams of sawdust, shredded wood or other ligno-cellulosic material. Agitate the mixture slowly adding 2-6 grams of urea. Add 3 milliliters of mixed acid composed of 1 part 96% sulphuric acid and 4 parts 98% acetic acid. Maintain the mixture in a molten state and agitate for 10 to 15 minutes, then add 1-3% pure lignin. Mix thoroughly, allow the wood to settle, and separate from the paraffin. Wash the pulp thoroughly with hot water.

For molding, add to this purified material ½-1% of 98% acetic acid and 3-4% lignin. Mix thoroughly and mold. For best strength results, mix the purified material just mentioned with ⅓ of its volume of identically treated material except for the cooking time in the paraffin bath, which is much shorter, being from 4-7 minutes.

Molding temperatures—240-330° F. suitable for use with low pressure steam.

Molding pressures—2,000-5,000 lbs. per square inch.

To the plastic thus produced may be incorporated other plastics of the phenol-formaldehyde type, and others to give the desired effects. It may also be coated with other resins, if desirable.

I claim:

1. A method for preparing cellulosic plastics which comprises dispersing a ligno-cellulosic material in a hydrocarbon bath inert with respect to said material, heating and agitating the dispersion, adding to the dispersion while continuing heat and agitation urea, a mixture of acetic and sulphuric acids, and lignin resin, stopping the agitation, and separating the resulting plastic from said inert bath.

2. A method for preparing cellulosic plastics which comprises dispersing a ligno-cellulosic material in a substantially non-aqueous hydrocarbon bath inert with respect to said material, heating and agitating the dispersion, adding to the dispersion while continuing heat and agitation urea, a mixture of acetic and sulphuric acids and lignin resin, stopping the agitation, and separating the resulting plastic from said inert non-aqueous hydrocarbon bath.

3. A method for preparing cellulosic plastics which comprises dispersing a ligno-cellulosic material in a bath of molten paraffin inert with respect to said material, heating and agitating the dispersion, adding to the dispersion while continuing heat and agitation urea, a mixture of acetic and sulfuric acids, and lignin resin, stopping the agitation, and separating the resulting plastic from said inert bath of molten paraffin.

BRUCE GELLER.